(12) United States Patent
Albl et al.

(10) Patent No.: US 10,047,798 B2
(45) Date of Patent: *Aug. 14, 2018

(54) SEALING SYSTEM FOR A ROLLING BEARING

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,797

(22) Filed: Oct. 7, 2016

(65) Prior Publication Data

US 2017/0102035 A1    Apr. 13, 2017

(30) Foreign Application Priority Data

Oct. 7, 2015    (DE) .................. 10 2015 012 998

(51) Int. Cl.
*F16C 19/18*    (2006.01)
*F16C 33/78*    (2006.01)
(Continued)

(52) U.S. Cl.
CPC ...... *F16C 33/7896* (2013.01); *B60B 27/0073* (2013.01); *F16C 19/163* (2013.01); *F16C 33/7823* (2013.01); *F16C 33/7886* (2013.01); *F16J 15/3232* (2013.01); *F16C 19/14* (2013.01); *F16C 33/583* (2013.01);
(Continued)

(58) Field of Classification Search
CPC ...... F16C 19/14; F16C 19/163; F16C 19/386; F16C 33/583; F16C 33/586; F16C 33/7826; F16C 33/7879; F16C 33/7886; F16C 2326/01; F16C 2326/02; F16C 33/786;
(Continued)

(56) References Cited

U.S. PATENT DOCUMENTS 3,936,105 A    2/1976 Asberg
5,232,292 A *  8/1993 Stackling ............ F16C 33/7806
                                              277/375
(Continued)

FOREIGN PATENT DOCUMENTS

CN    1985114 A    6/2007
CN    203146574 U  8/2013
(Continued)

OTHER PUBLICATIONS

Chinese Search Report dated May 24, 2018 with respect to counterpart Chinese patent application 201610865364.5.
(Continued)

*Primary Examiner* — Marcus Charles
(74) *Attorney, Agent, or Firm* — Henry M. Feiereisen LLC

(57) ABSTRACT

A sealing system for a rolling bearing, said sealing system includes a sealing body arranged on a stationary bearing ring of the rolling bearing. The sealing body has a first sealing lip which has a first sealing edge and with the first sealing edge rests with a pre-tension against a rotating first sealing surface. The second sealing lip is arranged further inward with respect to rolling bodies of the rolling bearing, and has a second sealing edge which in the installed state and in the absence of wear is spaced apart from a rotating second sealing surface by a distance.

12 Claims, 2 Drawing Sheets

(51) Int. Cl.
    *B60B 27/00*     (2006.01)
    *F16J 15/3232*     (2016.01)
    *F16C 19/16*     (2006.01)
    *F16C 19/14*     (2006.01)
    *F16C 33/58*     (2006.01)

(52) U.S. Cl.
    CPC ...... *F16C 33/7826* (2013.01); *F16C 2326/01* (2013.01); *F16C 2326/02* (2013.01)

(58) Field of Classification Search
    CPC . F16C 33/7823; F16J 15/3232; B60B 27/003; B60B 27/0073; B60B 27/0005
    USPC ........ 384/477, 486, 489, 544, 589; 277/347, 277/549, 551, 560; 301/105.1
    See application file for complete search history.

(56) References Cited

U.S. PATENT DOCUMENTS

| | | | | |
|---|---|---|---|---|
| 5,544,963 | A * | 8/1996 | Kajihara | F16C 33/726 |
| | | | | 384/482 |
| 5,803,617 | A * | 9/1998 | Ohnuki | F16C 19/186 |
| | | | | 384/486 |
| 7,758,249 | B2 * | 7/2010 | Shimizuya | F16C 19/186 |
| | | | | 384/484 |
| 8,382,377 | B2 * | 2/2013 | Yamamoto | B60B 27/0005 |
| | | | | 384/448 |
| 8,979,386 | B2 * | 3/2015 | Gruber | F16C 23/086 |
| | | | | 384/484 |
| 9,090,122 | B2 * | 7/2015 | Morita | F16C 33/805 |
| 9,797,453 | B2 * | 10/2017 | Norimatsu | F16C 33/7896 |
| 2007/0076994 | A1 | 4/2007 | Norimatsu et al. | |
| 2007/0147718 | A1 * | 6/2007 | Takimoto | F16C 33/7886 |
| | | | | 384/486 |
| 2007/0278748 | A1 * | 12/2007 | Matsui | F16C 33/7869 |
| | | | | 277/549 |
| 2008/0199113 | A1 | 8/2008 | Peschke et al. | |
| 2016/0178010 | A1 | 6/2016 | Kaiser et al. | |

FOREIGN PATENT DOCUMENTS

| | | | | |
|---|---|---|---|---|
| CN | 204628315 U | | 9/2015 | |
| DE | 28 03 093 | | 7/1979 | |
| DE | 2005 029 979 A1 | | 1/2007 | |
| DE | 2009 025 128 A1 | | 12/2010 | |
| DE | 2013 218 635 B4 | | 3/2015 | |
| EP | 2 261 523 A1 | | 12/2010 | |
| FR | 2688567 A1 | * | 9/1993 | .......... F16C 33/7876 |
| JP | 2007-198505 A | | 8/2007 | |
| JP | 2008-157327 A | | 7/2008 | |
| JP | 2012167775 A | * | 9/2012 | ............. F16C 33/78 |
| JP | 2013-204733 A | | 10/2013 | |
| WO | WO 03/081096 A1 | | 10/2003 | |

OTHER PUBLICATIONS

Translation of Chinese Search Report dated May 24, 2018 with respect to counterpart Chinese patent application 201610865364.5.

* cited by examiner

SEALING SYSTEM FOR A ROLLING BEARING

CROSS-REFERENCES TO RELATED APPLICATIONS

This application claims the priority of German Patent Application, Serial No. 10 2015 012 998.8, filed Oct. 7, 2015, pursuant to 35 U.S.C. 119(a)-(d), the disclosure of which is incorporated herein by reference.

BACKGROUND OF THE INVENTION

The invention relates to a sealing system for a rolling bearing.

The following discussion of related art is provided to assist the reader in understanding the advantages of the invention, and is not to be construed as an admission that this related art is prior art to this invention.

As is known wheel bearings of a motor vehicle that are configured as rolling bearings usually have a sealing system between the stationary bearing ring and the rotating bearing ring, which normally includes a sealing lip which is connected in rotative fixed relationship with the stationary bearing ring via a support element, which sealing lip rests against a rotating sealing surface and thereby seals toward the rotating part. In order to achieve a sealing effect even after a wear of the sealing lip it is known to provide multiple contacting sealing lips.

It would be desirable and advantageous to provide an improved sealing system for a rolling bearing so that a high sealing function of the sealing system is ensured over a long service life at low friction.

SUMMARY OF THE INVENTION

According to one aspect of the present invention, a sealing system for a rolling bearing, the sealing system includes a sealing body arranged on a stationary bearing ring of the rolling bearing, wherein the sealing body has a first sealing lip which has a first sealing edge and with the first sealing edge rests with a pre-tension against a rotating first sealing surface, wherein the second sealing lip is arranged further inward with respect to rolling bodies of the rolling bearing, and has a second sealing edge which in the installed state and in the absence of wear is spaced apart from a rotating second sealing surface by a distance.

The first sealing lip—in the following also referred to as main sealing lip—is under pre-tension and slidingly rests against the rotating first sealing surface via a sealing edge formed on the main sealing lip.

The second sealing lip—in the following also referred to as auxiliary sealing lip—is spaced apart from a rotating second sealing surface via a gap when no wear has yet occurred.

Because the sealing system according to the invention is in sliding contact with the rotating sealing surface via the sealing edge of only one sealing lip the sealing system according to the invention advantageously has a lower friction compared to the state of the art. The inventive arrangement of the auxiliary sealing lip or the spaced apart positioning of the sealing edge of the auxiliary sealing lip and the fact that the main sealing lip rests against the rotating first sealing surface with a pretension that at least partially acts in the direction of directed of the first sealing surface has the effect that when the first sealing lip or main sealing lip wears down the sealing body moves so that the gap to the sealing edge of the auxiliary sealing lip disappears and with this the auxiliary sealing lip engages on the associated sealing surface via its sealing edge. This advantageously ensures a high sealing function over the entire service life of the sealing system.

According to another advantageous feature of the invention, the sealing body of the sealing system has multiple auxiliary sealing lips or second sealing lips arranged sequentially behind each other whose sealing edges in the installed state are each spaced apart from the rotating second sealing surface via a gap when wear has not yet occurred. This embodiment is particularly advantages because the above mentioned readjustment process, i.e., that when one sealing lip wears down a subsequent sealing lip comes into engagement, can occur repeatedly so that the high sealing function is ensured over a longer service life of the sealing system.

According to another advantageous feature of the invention, the sealing body is hereby configured and/or dimensioned so that the sealing body itself exerts the pretension on the main sealing lip that acts at least partially in the direction of the rotating first sealing surfaces. This ensures a particularly simple construction of the sealing system.

According to another advantageous feature of the invention, the sealing body includes a support body, which exerts on the main sealing lip the pre-tension, which is at least partially directed toward the rotating first sealing surface. The advantage of this embodiment is that the pre tension can be adjusted by means of the support body more easily and in addition the support body increases the own stability of the sealing system and depending on the configuration and arrangement of the support body the support body carries the mounting force to the stationary bearing ring of the rolling bearing.

On order to enable a particularly lightweight construction of the sealing system the sealing body is preferably made of an elastomer and the support body is made of a plastic material.

As an alternative it is also possible that the support body is made of a metallic material.

According to another advantageous feature of the invention, the main sealing lip is oriented toward a first component that has the first sealing surface, while the auxiliary sealing lip or the auxiliary sealing lips are oriented toward a second component that has the second sealing surface. The orientation of the sealing lips toward different components is advantageous because this allows sealing intermediate spaces or using different materials for the sealing surfaces (for example sealing surface 1 is stainless steel, for sealing surface 2 no longer required . . . )

According to another advantageous feature of the invention, the first component that has the first sealing surface is the component, for example the wheel hub, that is supported for rotation via the rotating bearing ring of the rolling bearing and the second component that has the second sealing surface is the rotating bearing ring of the rolling bearing.

A compact mounting-space-efficient embodiment of the sealing system can be realized in that the main sealing lip and the auxiliary sealing lip or auxiliary sealing lips are oriented toward a common component that has the first sealing surface as well as the second sealing surface.

A particularly small mounting space is required when the component that has the first and second sealing surfaces is the rotating bearing ring of the rolling bearing.

As an alternative the common component, which has the first and the second sealing surfaces, is a carrier element that is arranged in the rotating bearing ring of the rolling bearing.

The configuration of the sealing surfaces on a separate carrier element has the advantage that the separate carrier element can be produced and mounted in a simple and cost-effective manner and the rotating bearing ring of the rolling bearing does not have to meet further demands.

According to another advantageous feature of the invention, a water drain groove is formed on the sealing body. This advantageously ensures a defined drain.

In order to ensure a better sealing function the first and/or second sealing surface is configured conical, spherically curved or has another geometrically inclined shape.

According to another advantageous feature of the invention, the first and/or second sealing surface is provided with a coating and/or stiffening and/or is made of a non-corrosive material. This advantageously minimizes wear of the sealing lip.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
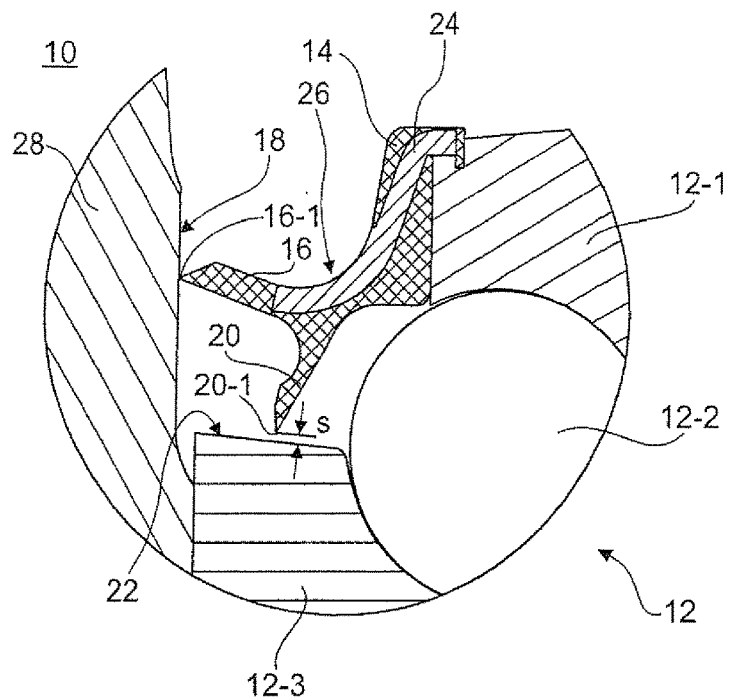
FIG. 1 shows a first embodiment of the sealing system according to the invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a sealing system designated with reference numeral 10 for a rolling bearing 12 in a newly installed state, i.e., wear has not yet occurred.

The sealing system 10 includes a sealing body 14 supported on the stationary bearing ring 12-1 of the rolling bearing 12 with a first sealing lip 16 and a second sealing lip 20. The first sealing lip 16, in the following also referred to as main sealing lip 16, hereby slidingly rests with a pre-tension against a rotating first sealing surface 18 via its sealing edge 16-1.

As shown in FIG. 1 the second sealing lip 20—in the following also referred to as auxiliary sealing lip—is arranged further inward with respect to the rolling bodies 12-2 of the rolling bearing 12 and the sealing edge 20-1 of the auxiliary sealing lip 20 is arranged spaced apart from a rotating second sealing surface 22 in the installed state when a wear has not yet occurred.

As further shown in FIG. 1 the sealing body 14 has a support body 24 and a water draining groove 26 is formed on the sealing body 14. In the present case the support body 24 is made of a metallic material and exerts on the main sealing lip 16 the pre-tension which is at least partially oriented towards the rotating first sealing surface 18.

While FIG. 1 shows that the first sealing surface 18 is formed on the wheel hub 28, which is rotatably supported via the rotating bearing ring 12-3 of the rolling bearing 12, the second rotating sealing surface 22 is directly formed on the rotating bearing ring 12-3 of the rolling bearing 12.

The configuration of the sealing system 10 according to the invention has the effect that after the main sealing lip 16 has undergone wear the sealing body 14 moves due to the pre-tension so that the gap s disappears and the auxiliary sealing lip 20 engages on the associated sealing surface 22 via its sealing edge 20-1. Thus a high sealing function is ensured over the entire service life of the sealing system 10. Because additionally the sealing system 10 is in sliding contact with a rotating component via only one sealing lip, the inventive sealing system has a low friction.

Figure 2:
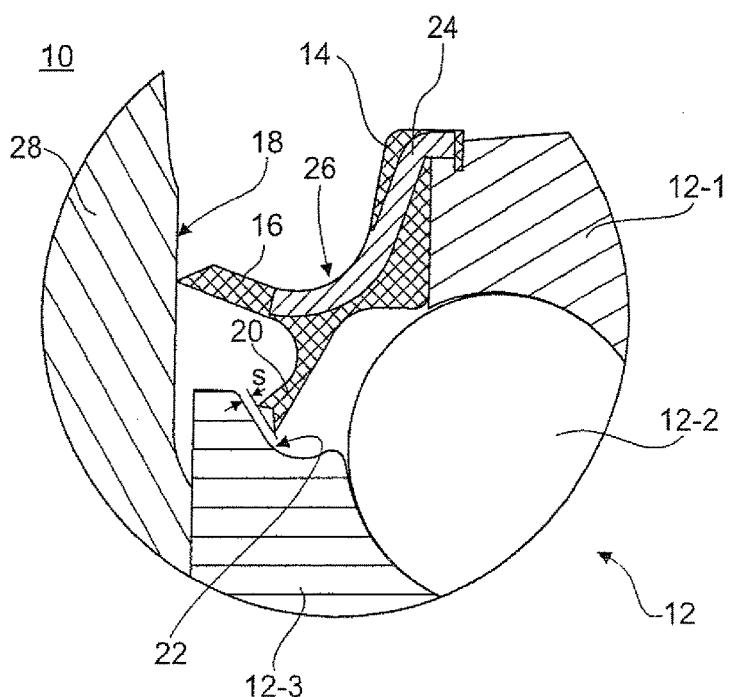
FIG. 2 shows a second embodiment of the sealing system according to the invention.

The embodiment of the sealing system 10 shown in FIG. 2 essentially corresponds to the embodiment shown in FIG. 2. The only difference is that the sealing surface 22 is conically formed on the rotating bearing ring 12-3 of the rolling bearing 12.

Figure 3:
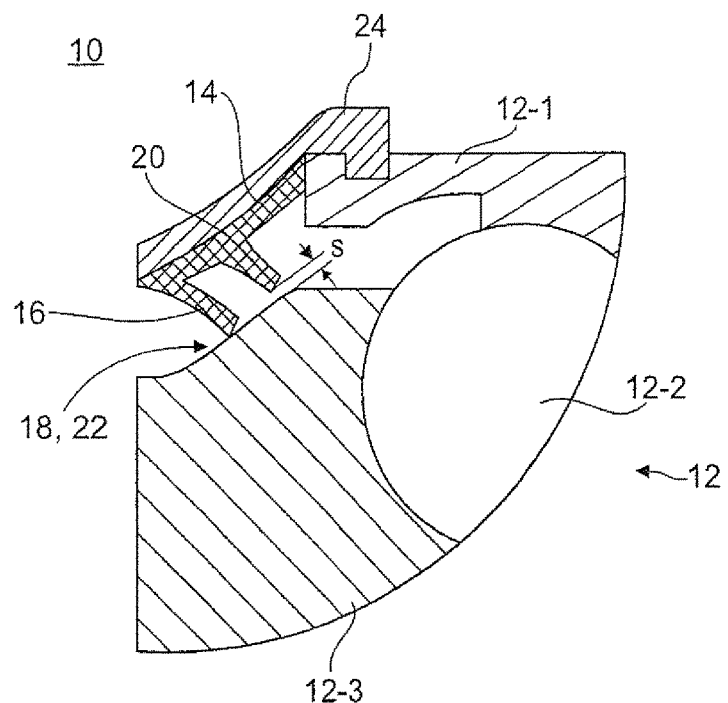
FIG. 3 shows a third embodiment of the sealing system according to the invention.

The embodiment of the sealing system 10 according to the invention shown in FIG. 3 is in particular characterized in that in contrast to the embodiments shown in FIG. 1 and FIG. 2 the first rotating sealing surface 18 and the second rotating sealing surface 22 are formed on a common component, i.e., in the present case on the rotating bearing ring 12-3 of the rolling bearing 12.

Figure 4:
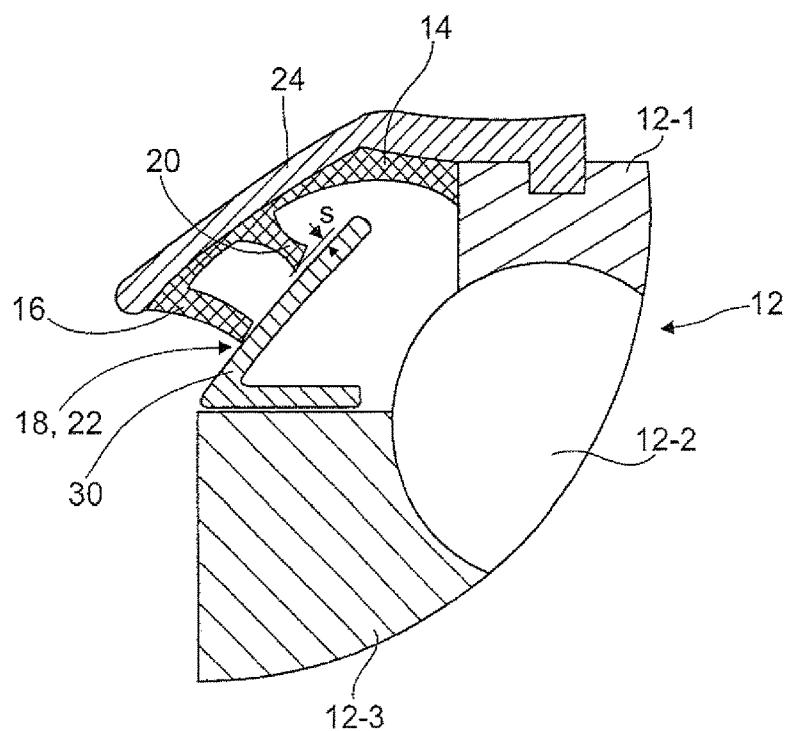
FIG. 4 shows a fourth embodiment of the sealing system according to the invention.

Also in the embodiment shown in FIG. 4 the sealing surfaces 18, 22, are—in correspondence with the embodiment according to FIG. 3—formed on a common component. In contrast to the embodiment of FIG. 3 the component that has the sealing surfaces 18, 22 is a carrier element 30 that is arranged on the rotating bearing ring 12-3 of the rolling bearing 12.

In all shown embodiments the sealing body 14 can also have multiple auxiliary sealing lips 20 arranged sequentially behind each other so that the described readjustment process, i.e., that in the event of wear of the sealing lip that is in engagement, a subsequent sealing lip repeatedly comes into sliding contact with a rotating sealing surface.

What is claimed as new and desired to be protected by Letters Patent is set forth in the appended claims and includes equivalents of the elements recited therein:

1. A sealing system for a rolling bearing, said sealing system comprising:
    a sealing body arranged on a stationary bearing ring of the rolling bearing, said sealing body including a first sealing lip which has a sealing edge via which the first sealing lip rests with a pre-tension against a rotating first sealing surface, a second sealing lip arranged further inward than the first sealing lip with respect to rolling bodies of the rolling bearing, said second sealing lip having a sealing edge which in the installed state and in the absence of wear is spaced apart from a separate rotating second sealing surface by a distance, and a first component having the first sealing surface and a second component having the second sealing surface, wherein the first sealing lip is oriented toward the first component and the second sealing lip is oriented toward the second component.

2. The sealing system of claim 1, wherein the sealing body has a plurality of said second sealing lip, said second sealing lips sequentially arranged behind each other.

3. The sealing system of claim 1, wherein the sealing body is configured so as to exert the pre-tension.

4. The sealing system of claim 1, wherein the sealing body includes a support body configured to exert the pre-tension.

5. The sealing system of claim 4, wherein the support body is made of a plastic material or a metallic material and the sealing body is made of an elastomer.

6. The sealing system of claim 1, wherein the second component is a rotating bearing ring of the rolling bearing and wherein the first component is rotatably supported via the rotating bearing ring.

7. The sealing system of claim 1, further comprising a common component having the first and the second sealing surfaces, wherein the first sealing lip and the second sealing lip are oriented toward the common component.

8. The sealing system of claim 7, wherein the common component is a rotating bearing ring of the rolling bearing.

9. The sealing system of claim 7, wherein the common component is a carrier element arranged on a rotating bearing ring of the rolling bearing.

10. The sealing system of claim 1, wherein the sealing body is configured to exhibit a water drain groove.

11. The sealing system of claim 1, wherein the first and/or the second sealing surface have a conical shape or another geometrically inclined shape.

12. The sealing system of claim 1, wherein the first and/or the second sealing surface are provided with a coating and/or a thickening and/or are made of a non-corrosive material.

* * * * *